United States Patent [19]

Ohata et al.

[11] Patent Number: 4,987,180

[45] Date of Patent: Jan. 22, 1991

[54] SILICONE-BASED FABRIC FINISHING AGENT

[75] Inventors: Hiroyuki Ohata, Takefu; Masaki Tanaka; Hiroshi Ohashi, both of Annaka; Kiyoji Suemoto, Sabae; Hidekazu Iida, Imadate; Hiroshi Saga, Takefu, all of Japan

[73] Assignees: Shin-Etsu Chemical Co., Ltd., Tokyo; Nissin Chemical Co., Ltd., Takefu, both of Japan

[21] Appl. No.: 288,903

[22] Filed: Dec. 23, 1988

[30] Foreign Application Priority Data

Dec. 23, 1987 [JP] Japan ................. 62-326587

[51] Int. Cl.$^5$ ............................................. C08L 83/04
[52] U.S. Cl. .................................. 524/860; 525/100; 525/479; 524/862; 524/861; 524/588; 528/17; 528/19; 528/18; 528/26; 528/31
[58] Field of Search ............... 525/100, 479; 528/17, 528/19, 18, 26, 31; 524/862, 861, 860, 588

[56] References Cited

U.S. PATENT DOCUMENTS

| | | | |
|---|---|---|---|
| 3,624,015 | 11/1971 | Vaughn et al. | 260/28.5 |
| 3,898,300 | 8/1975 | Hilliard | 260/827 |
| 4,071,577 | 1/1978 | Falender et al. | 260/827 |
| 4,464,506 | 8/1984 | Alberts et al. | 524/588 |
| 4,584,337 | 4/1986 | Lee et al. | 528/26 |
| 4,631,208 | 12/1986 | Westall | 528/17 |
| 4,690,986 | 9/1987 | Sasaki et al. | 525/479 |

OTHER PUBLICATIONS

Abstract of JP 51-25369.
Abstract of JP 52-12231.
Abstract of JP 54-3512.
Abstract of JP 48-102188.
Abstract of JP 60-88040.
Abstract of JP 61-106614.
Abstract of JP 61-136510.

*Primary Examiner*—Melvyn I. Marquis
*Assistant Examiner*—Karen A. Hellender
*Attorney, Agent, or Firm*—Millen, White & Zelano

[57] ABSTRACT

An excellently pleasant feeling of softness and elastic resilience can be imparted to a fabric material treated with the inventive fabric finishing agent which is an aqueous emulsion of a copolymer obtained by the emulsion polymerization, in an aqueous emulsion of an organopolysiloxane having radical-polymerizable groups, e.g., vinyl groups, or mercapto-substituted hydrocarbon groups, e.g., 3-mercaptopropyl groups, as the polymerization medium of an acrylic or methacrylic monomer, e.g., alkyl acrylates and methacrylates, in a specified amount relative to the amount of the organopolysiloxane. The acrylic or methacrylic monomer may be partly replaced with a polyfunctional monomer, e.g., acrylic and methacrylic acids, N-methylol acrylamide, glycidyl methacrylate, 2-hydroxyethyl methacrylate and the like, and/or a monomer of the third class, e.g., styrene and acrylonitrile. The emulsion may be further admixed with an organohydrogen polysiloxane as a crosslinking agent and a catalyst for the crosslinking reaction.

16 Claims, No Drawings

SILICONE-BASED FABRIC FINISHING AGENT

BACKGROUND OF THE INVENTION

The present invention relates to a silicone-based fabric finishing agent or, more particularly, to a fabric finishing agent which is an aqueous emulsion of a silicone-based copolymer capable of imparting a fabric material with a soft and pleasant feeling of high resilience with excellent launderability and durability.

It is conventional to use an organopolysiloxane fluid as a fabric treatment agent for softening finish or to use a crosslinkable organopolysiloxane as a fabric treatment agent for elastic finish. These silicone-based fabric finishing agents, however, are not fully effective when elastic resilience of high level is desired of the fabric materials treated therewith. Accordingly, it is desired to develop a silicone-based fabric treatment agent capable of forming a coating film on the fibers of the treated fabric material to impart improved softness and enhanced elastic resilience thereto.

Japanese Patent Publication No. 52-12231 teaches that a tough and highly resilient coating film on fibers can be formed by treating a fabric material with an aqueous dispersion of a film-forming copolymer prepared by the copolymerization of an organic monomer such as styrene in an aqueous medium with a vinyl group-containing organopolysiloxane obtained by emulsion polymerization. This fabric treatment agent, however, is not satisfactory for a finishing treatment of fabric materials in general because of the stiffness of the coating film formed on fiblers. Japanese Patent Kokai No. 58-126378 discloses a fabric treatment agent comprising a polymerizate obtained by the copolymerization of a vinyl group-containing organopolysiloxane, an organohydrogenpolysiloxane and a vinyl monomer. This fabric treatment agent, however, imparts the treated fabric material with a stiff feeling and is not capable of imparting a pleasant feeling of softness. It is therefore highly desirable to develop a fabric treatment agent capable of imparting well balanced softness and elastic resilience to the fabric material treated therewith.

SUMMARY OF THE INVENTION

The present invention accordingly has an object to provide a novel and improved silicone-based fabric finishing agent capable of imparting well balanced softness and elastic resilience to the fabric material treated therewith without the above described problems and disadvantages in the conventional fabric treatment agents of the prior art.

Thus, the present invention provides a silicone-based fabric finishing agent which is an aqueous emulsion of a copolymer obtained by the emulsion polymerization of:
(A) from 5 to 95 parts by weight of an organopolysiloxane represented by the general formula

$$XO-(-SiR_2-O-)_m-(-SiRY-O-)_n-X, \quad (I)$$

in which R is a monovalent hydrocarbon group or a halogen-substituted monovalent hydrocarbon group having 1 to 20 carbon atoms, Y is a radical-polymerizable monovalent organic group or a mercapto-containing monovalent orgainc group, X is a hydrogen atom, a lower alkyl group or an organosilyl group of the general formula $-SiR_2R^1$, R having the same meaning as defined above and $R^1$ being R or Y, m is a positive integer not exceeding 10,000 and n is a positive integer, in the form of an oil-in-water type emulsion; and
(B) from 95 to 5 parts by weight of an acrylic or methacrylic monomer represented by the general formula

$$CH_2=CR^1-CO-OR^2, \quad (II)$$

in which $R^1$ is a hydrogen atom or a methyl group and $R^2$ is an alkyl group or an alkoxy-substituted alkyl group having 1 to 18 carbon atoms; in the presence of a radical polymerization initiator,
(C) up to 10% by weight of the component (B) being optionally replaced with a polyfunctional monomer selected from the group consisting of ethylenically unsaturated amides, alkylol- or alkoxyalkyl-substituted ethylenically unsaturated amides, oxirane group-containing ethylenically unsaturated monomers, hydroxyl group-containing ethylenically unsaturated monomers, carboxyl group-containing ethylenically unsaturated monomers, esters of a polyhydric alcohol and acrylic or methacrylic acid, diallyl esters of dibasic carboxylic acids, allyl acrylate, allyl methacrylate and divinyl benzene, and
(D) up to 20% by weight of the component (B) being optionally replaced with one kind or more of ethylenically unsaturated monomers other than the components (B) and (C) defined above.

DETAILED DESCRIPTION OF THE PREFERRED EMBODIMENTS

As is described above, the silicone-based fabric finishing agent of the present invention is an aqueous emulsion of a copolymer obtained by the emulsion copolymerization of an acrylic or methacrylic monomer as the component (B) in an oil-in-water type emulsion of an organopolysiloxane having radical-polymerizable groups or mercapto groups in the presence of a radical polymerization initiator. The fabric finishing agent is capable of imparting well balanced softness and elastic resilience to the fabric material treated therewith and the effect is highly launderable and durable.

One of the essential constituents of the copolymer comprised in the inventive fabric finishing agent is an organopolysiloxane represented by the general formula (I) given above. In the formula (I), the symbol R denotes a monovalent hydrocarbon group having 1 to 20 carbon atoms including alkyl groups, e.g., methyl, ethyl, propyl and butyl groups, and aryl groups, e.g., phenyl, tolyl, xylyl and naphthyl groups, or a halogen-substituted monovalent hydrocarbon group obtained by replacing a part or all of the hydrogen atoms in the above named hydrocarbon groups with halogen atoms. The symbol X denotes a hydrogen atom, a lower alkyl group having 1 to 5 carbon atoms such as methyl, ethyl, propyl and butyl groups or an organosilyl group of the formula $-SiR_2R'$, in which R has the same meaning as defined above and R' is R or Y. The symbol Y denotes a radical-polymerizable or mercapto-containing monovalent organic group exemplified by vinyl, allyl, 3-acryloxypropyl, 3-methacryloxypropyl and 3-mercaptopropyl groups. The subscript m is a positive integer not exceeding 10,000 or, preferably, in the range from 500 to 8000 and the subscript n is a positive integer, preferably, not exceeding 500. The group denoted by R is preferably a methyl group.

The organopolysiloxane as the component (I) in the form of an aqueous emulsion can be prepared by a known method. The starting materials used in the preparation thereof include, assuming that the group denoted by R is a methyl group, cyclic dimethyl siloxane oligomers containing 3 to 6 of the units —SiMe$_2$—O—, Me being a methyl group, and linear dimethyl polysiloxanes terminated at both molecular chain ends with silanolic hydroxy groups, alkoxy, e.g., methoxy and ethoxy, groups bonded to the terminal silicon atoms or trimethyl silyl groups. The starting materials for introducing the silicon-bonded group denoted by Y include methyl vinyl dimethoxy silane, methyl vinyl diethoxy silane, methyl allyl dimethoxy silane, methyl 3-methacryloxypropyl dimethoxy silane, methyl 3-mercaptopropyl diethoxy silane and the like as well as the hydrolysis products of these silane compounds in the form of a cyclic oligomer composed of 3 to 6 of the methyl vinyl siloxane units, methyl 3-methacryloxypropyl siloxane units, methyl 3-acryloxypropyl siloxane units, methyl 3-mercaptopropyl siloxane units and the like. When introduction of trifunctional siloxane units into the organopolysiloxane is desired, a small amount of trialkoxy silane or a hydrolysis product thereof can be used in combination with the above described two clases of the starting materials.

A typical procedure for the preparation of the organopolysiloxane of the general formula (I) in the form of an aqueous emulsion is as follows. Thus, a cyclic dimethyl siloxane oligomer such as octamethyl cycloterasiloxane and dialkoxy silane having a radical-polymerizable or mercapto-containing group or a hydrolysis product thereof are mixed together in a suitable proportion and the mixture is subjected to a polymerization reaction in the presence of a strongly alkaline or strongly acidic catalyst to form a high-polymeric organopolysiloxane which is dispersed and emulsified in an aqueous medium containing a surface active agent as an emulsifier. Alternatively, the above mentioned mixture of the two types of the starting materials is dispersed and emulsified in an aqueous medium containing a sulfonic acid-based or sulfate ester-based surface active agent, which serves both as an emulsifier and a strongly acidic polymerization catalyst, to effect the polymerization of the starting materials in an emulsified state. Similarly, the emulsion polymerization of the starting materials can be performed by first dispersing and emulsifying the mixture of the starting materials in an aqueous medium containing a cationic surface active agent such as an alkyl trimethyl ammonium chloride and alkyl benzyl ammonium chloride followed by the addition of an appropriate amount of a strongly alkaline compound such as potassium hydroxide, sodium hydroxide and the like.

Examples of the polymerization catalyst used in the polymerization reaction of the starting materials include potassium hydroxide, sodium hydroxide, cesium hydroxide, tetramethyl ammonium hydroxide, tetrabutyl phosphonium hydroxide and the like as the strongly alkaline catalyst and sulfuric acid, trifluoromethane sulfonic acid and the like as the strongly acidic catalyst. The thus obtained organopolysiloxane is then neutralyzed to deactivate the strongly alkaline or acidic catalyst before it is emulsified in an aqueous medium.

The surface active agent used as the emulsifier of the organopolysiloxane can be non-ionic, anionic or cationic. Examples of suitable surface active agents include polyoxyethylene alkyl ethers, polyoxyethylene alkylphenyl ethers, polyoxyethylene alkyl esters, fatty acid esters of sorbitan, fatty acid esters of polyoxyethylene sorbitan, fatty acid esters of sucrose and the like as the non-ionic surface active agent, sodium lauryl sulfate, sodium polyoxyethylene dodecyl sulfate and the like as the anionic surface active agent and alkyl trimethyl ammonium chloride, alkyl benzyl ammonium chloride, dialkyl dimethyl ammonium chloride and the like as the cationic surface active agent.

Examples of the sulfonic acid-based and sulfate ester-based surface active agents used in the above mentioned emulsion polymerization of the starting materials include 4-hydrxylphenyl sulfonic acid, 4-octylphenyl sulfonic acid, 4-decylphenyl sulfonic acid, 4-dodecylphenyl sulfonic acid, 4-tetradecylphenyl sulfonic acid, $C_8H_{17}(OC_2H_4)_2OSO_3H$, $C_{10}H_{21}(OC_2H_4)_2OSO_3H$, sodium lauryl sulfate, sodium polyoxyethylene dodecyl phenyl sulfate and the like. When a salt of sulfate ester is used as the emulsifier, the emulsion obtained therewith is subsequently brought into contact with a cation exchange resin so that the salt is converted into the corresponding free acid to exhibit an activity as the polymerization catalyst. After completion of the polymerization reaction, the polymerization catalyst in the form of a free acid is neutralized to be deactivated. When a strongly alkaline surface active agent, which is typically a quaternary ammonium hydroxide, is used as the emulsifier and polymerization catalyst in the emulsion polymerization, the surface active agent after completion of the polymerization reaction is neutralized and deactivated.

The organopolysiloxane represented by the general formula (I) in the form of an aqueous emulsion should have a relatively large molecular weight in order that the fabric finishing agent prepared therefrom imparts a feeling of well balanced softness and elastic resilience to a fabric material treated therewith. In this regard, the organopolysiloxane to be subsequently emulsified should be prepared so as to have a sufficiently high molecular weight by controlling the conditions in the polymerization reaction. When the aqueous emulsion of the organopolysiloxane is prepared by the method of emulsion polymerization, the molecular weight of the organopolysiloxane can be increased by subjecting the polymerization mixture after completion of the polymerization reaction to an aging treatment at a relatively low temperature of 30° C. or below or, preferably, 15° C. or below.

The component (B) is a monomer to be graft-copolymerized on to the above described organopolysiloxane as the component (A). The component (B) is a (meth)acrylic, i.e. acrylic or methacrylic, monomer represented by the general formula (II) given above. Examples of suitable (meth)acrylic monomers include methyl (meth)acrylate, ethyl (meth)acrylic, propyl (meth)acrylate, butyl (meth)acrylate, lauryl (meth)acrylate, stearyl (meth)acrylate and the like as the alkyl (meth)acrylate and methoxynethyl (meth)acrylate, methoxyethyl (meth)acrylate, ethoxyethyl (meth)acrylate, butoxyethyl (meth)acrylate and the like as the alkoxyalkyl (meth)acrylate. These (meth)acrylate monomers can be used either singly or as a combination of two kinds or more according to need. Although the component (B) can be partly replaced with the components (C) and/or (D), the weight fraction of the component (B) in the combination of the components (A), (B) and (C) should be at least 70% because otherwise the performance of the fabric finishing agent prepared therefrom would be poor relative to the properties inherent in the acrylic polymers such as mechanical strengths, resistance against ozone, adhesion of the surface of the fibers to be imparted to the fabric material treated therewith.

The component (C), with which a part of the component (B) is optionally replaced, is a polyfunctional monomer, i.e. a monomer having two or more of functional groups in a molecule, including several classes of ethylenically unsaturated monomers. Examples of the ethylenically unsaturated amides and the alkylol or alkoxyalkyl compounds of ethylenically unsaturated amides include (meth)acrylamide, diacetone (meth)acrylamide, N-methylol (meth)acrylamide, N-butoxymethyl (meth)acrylamide, N-methoxymethyl (meth)acrylamide and the like. Examples of the oxirane group-containing monomers include glycidyl (meth)acrylate, glycidyl allyl ether and the like. Examples of the hydroxyl group-containing unsaturated monomers include 2-hydroxyethyl (meth)acrylate, 2-hydroxypropyl (meth)arcylate and the like. Examples of the carboxyl group-containing ethylenically unsaturated monomers include (meth)acrylic acid, maleic anhydride, crotonic acid, itaconic acid and the like. Examples of the full esters of a poly-hydric alcohol and (meth)acrylic acid include ethylene glycol di(meth)acrylate, diethylene glycol di(meth)acrylate, trimethylol propane tri(meth-)acrylate and the like. Other suitable monomers as the component (C) include diallyl adipate, diallyl phthalate, allyl (meth)acrylate and divinyl benzene.

Partial replacement of the component (B) with the above described component (C) has an effect to improve the adhesion of the fabric finishing agent to the surface of the fibers and also to improve the durability and resistance against dry cleaning. When the amount of the component (C) is too large, however, the treated fabric material would be imparted with somewhat degraded feeling although the adhesion of the finishing agent to the fibers and the durability of the treated fabric materials can be improved so much. In this regard, the amount of the component (B) replaced with the component (C) should not exceed 10% by weight or, preferably, should be in the range from 2 to 7% by weight in order to obtain very pleasant feeling of the fabric material treated with the fabric finishing agent.

The component (D) is an ethylenically unsaturated monomer which is not under the definitions of the components (B) and (C). Examples of such monomers include styrene, α-methyl styrene, acrylonitrile, vinyl chloride, vinylidene chloride, vinyl acetate, vinyl propionate, vinyl esters of a branched alkyl-containing carboxylic acid sold under the trade name of Versatic Acid and the like. Partial replacement of the component (B) with the component (D) may have an effect of further increasing the adhesion of the fabric finishing agent to the fibers and the durability of the treated fabric materials as well as imparting the fabric material with special feeling not obtainable by using the component (B) or a combination of the compounds (B) and (C) alone. In any event, however, the amount of the component (B) replaced with the component (D) should not exceed 20% by weight since otherwise the characteristic features obtained by the use of the acrylic monomers would by lost more or less.

When it is desired that a fabric material is imparted with a feeling of increased softness, the polymer derived from the component (B) optionally in combination with the components (C) and/or (D) also should have increased softness or flexibility. In this regard, the polymer should have a glass transition point of 0° C. or below or, preferably, −10° C. or below. Such a low glass transition point of the polymer can be obtained by a suitable selection and combination of the monomer or monomers as the components (B), (C) and (D). The glass transition point of a polymer or a copolymer implied in this invention is a temperature calculated for the constituents other than the organopolysiloxane according to the method taught by T. G. Fox, Bull. Am. Phys. Soc., 1, 123 (1956).

The weight proportion of the organopolysiloxane as the component (A) to the component (B) or a combination of the components (B), (C) and (D) is in the range from 5:95 to 95:5. When the amount of the organopolysiloxane is too small, the treated fabric material may exhibit some tackiness along with a decrease in the softness. When the amount thereof is too large, on the other hand, the practical value of the treated fabric material is greatly decreased due to the loss of the durability as a consequence of the decreased strength of the coating film on the fiber surface and poor adhesion of the coating film to the fiber surface.

The emulsion copolymerization of the component (B) or a combination of the components (B), (C) and (D) in the presence of the component (A) can be performed according to a known procedure by using a conventional radial polymerization initiator.

Examples of the radical polymerization initiators include water-soluble ones such as persulfates, e.g., potassium persulfate and ammonium persulfate, hydrogen peroxide, tert-butyl hydroperoxide, azobisamidinopropane hydrochloride and the like and monomer-soluble ones such as benzoyl peroxide, cumene hydroperoxide, dibutyl peroxide, diisopropyl peroxy carbonate, cumyl peroxy neodecanoate, cumyl peroxy octoate, azobisisobutyronitrile and the like. It is optional according to need that the above named peroxide initiator is combined with a reducing agent such as sodium hydrogen sulfite, Rongalite, L-ascorbic acid, saccharides, amines and the like to form a redox-type initiator system.

Since the aqueous emulsion of the organopolysiloxane already contains an emulsifier, additional addition of a surface active agent to the emulsion-polymerization mixture is not always necessary. It is of course optional to add a supplemental amount of a surface active agent to the mixture with an object to prevent occurrence of a coagulum in the course of the emulsion polymerization or to enhance the stability of the emulsion. Examples of suitable surface active agents for this supplemental addition include anionic ones such as salts of an alkyl or alkylaryl sulfate or sulfonate, salts of an alkylaryl succinate and the like, cationic ones such as alkyl trimethyl ammonium chlorides, alkyl benzyl ammonium chlorides and the like and non-ionic ones such as polyoxyethylene alkylphenyl ethers, polyoxyethylene alkyl ethers, esters of polyoxyethylene carboxylic acids and the like.

The aqueous emulsion of the copolymer prepared in the above described manner is used for fabric treatment with further admixture of a crosslinking agent and a catalyst for the crosslinking reaction as the auxiliary ingredients.

The crosslinking agent is preferably an organohydrogen polysiloxane or, in particular, methyl hydrogen polysiloxane having at least three methyl groups in a molecule replaced with silicon-bonded hydrogen atoms and copolymeric organopolysiloxane composed of the $HMe_2SiO_{0.5}$ units, $Me_3SiO_{0.5}$ units and $SiO_2$ units optionally as combined with the HMeSiO units and/or Me$_2$SiO units. The molar ratio of the monofunctional units, i.e. HMe$_2$SiO$_{0.5}$ and Me$_3$SiO$_{0.5}$ units, to the tetrafunctional units, i.e. SiO$_2$ units, is preferably in the range from 0.5 to 2.0.

Examples of the catalysts of the crosslinking reaction include dibutyltin and dioctyltin carboxylates, e.g., acetates, octoates and laurates, zinc carboxylates, e.g., octoate and laurate, titanate esters, e.g., tetrabutyl titanate, and the like.

Although addition of these auxiliary ingredients to the aqueous emulsion of the copolymer is not essential, it is preferable that the aqueous emulsion is admixed with up to 50 parts by weight of the crosslinking agent and up to 50 parts by weight of the catalyst for crosslinking reaction per 100 parts by weight of the copolymer in the aqueous emulsion. These auxiliary ingredients are added to the aqueous emulsion of the copolymer also in the form of an aqueous emulsion separately prepared by using an emulsifier whichg may be the same one as used in the preparation of the copolymer emulsion.

The above mentioned crosslinking agent is reactive with the hydroxy groups and alkoxy groups bonded to the silicon atoms of the organopolysiloxane as the component (A) to form crosslinks. Accordingly, the fabric material treated with the fabric finishing agent of the invention is imparted with further improved elastic resilience and durability against laundering by virtue of the crosslinked struture of the coating films formed on the surface of the fibers.

Thus, the fabric finishing agent of the invention is capable of imparting a pleasant feeling of softness and elastic resilience with high durability against laundering to a fabric material treated therewith because the finishing agent has excellent film-formability on the fiber surface. When the covering cloth of a down-filled cushion or bedquilt is treated with the inventive fabric finishing agent, the cloth is imparted with the so-called "down-proofness", which means that the fine fluffs of the down inside is prevented from coming out through the mesh openings of the cloth, owing to the good film-formability of the finishing agent. When a cloth for an outerwear is treated with the inventive fabric finishing agent, the cloth can be rendered wind-shielding by adequately controlling the air-permeability. These advantages can be further enhanced by compounding the inventive fabric finishing agent with a crosslinking agent and a catalyst for the crosslinking reaction with further increased elastic resilience and launderability.

In the following, examples are given to illustrate the fabric finishing agent of the invention in more detail. In the description given below, the term of "parts" always refers to "parts by weight".

EXAMPLE 1

An aqueous emulsion of an organopolysiloxane was prepared in the following manner. Thus, 15 g of sodium lauryl sulfate and 10 g of dodecylbenzene sulfonic acid were added to a mixture of 1500 g of octamethyl cyclotetrasiloxane, 3.8 g of poly(3-methacryloxypropyl methyl siloxane) and 1500 g of pure water and the mixture was agitated using a homomixer to emulsify the organopolysiloxanes in water. The thus prepared base emulsion was passed twice through a homogenizer under a pressure of 3000 psi to give a stabilized aqueous emulsion. The emulsion in a flask was heated at 70° C. for 12 hours with agitation followed by cooling to 25° C. and kept standing at this temperature to effect aging. After adjustment of the pH of the emulsion to 7 by adding a small amount of sodium carbonate, the emulsion was subjected to steam distillation for 4 hours under bubbling of nitrogen gas to distil off the volatile low-molecular organopolysiloxane. Thereafter, a small volume of water was added to the emulsion so as to adjust the content of non-volatile matter therein to 45% by weight. The thus obtained emulsion is referred to as the emulsion E-1 hereinbelow. The content of the 3-methacryloxypropyl groups in the organopolysiloxane in this emulsion E-1 was 0.1% by moles based on the total amount of the silicon-bonded organic groups.

Similarly, organopolysiloxane emulsions E-2 to E-6 were prepared each in substa-ntially the same manner as above excepting replacement of 3.8 g of the poly(3-methacryloxypropyl methyl siloxane) with 19 g of the same siloxane, with 96.4 g of a poly(3-mercaptopropyl methyl siloxane), with 3.5 g of a poly(3-acryloxypropyl methyl siloxane), 35 g of the same poly(3-acryloxypropyl methyl siloxane) and 17.2 g of a poly(vinyl methyl siloxane) for E-2, E-3, E-4, E-5 and E-6, respectively. Conditions of the aging treatment of these emulsions were: at 15° C. for 72 hours for E-2, at 25° C. for 24 hours for E-3 and at 10° C. for 72 hours for E-4, E-5 and E-6.

By using the above prepared organopolysiloxane emulsions, copolymer emulsions were prepared in the following manner. Thus, 333 g of the emulsion E-1 containing 150 g of the organopolysiloxane and 517 g of pure water were introduced into a threenecked flask of 2 liters capacity equipped with a stirrer, reflux condenser, thermometer and inlet tube for nitrogen gas and the temperature of the emulsion was kept at 30° C. under a stream of nitrogen gas. Thereafter, 1.0 g of tert-butyl hydroperoxide, 0.5 g of L-ascorbic acid and 0.002 g of iron (II) sulfate heptahydrate were added to and dissolved in the emulsion and then, while keeping the emulsion at 30° C., a mixture of 328.6 g of butyl acrylate, 10.5 g of acrylic acid and 5.3 g of methacrylic acid and 56 g of a 10% aqueous solution of N-methylol acrylamide were added thereto dropwise over a period of 3 hours. After completion of the dropwise addition of the monomers, agitation of the mixture was continued for additional one hour to complete the reaction. The solid content of the thus obtained aqueous emulsion, which is referred to as the emulsion P-1 hereinbelow, was 39.8% by weight. The copolymer contained in this emulsion P-1 had a glass transition point of −46° C. calculated for the constituents other than the organopolysiloxane.

Similarly, six more copolymer emulsions, referred to as the emulsions P-2 to P-7 hereinbelow, were prepared in substantially the same manner as above by using one of the emulsions E-1 to E-6. Table 1 below summarizes amount of the emulsion taken and the content of the organopolysiloxane therein as well as the formulation of the monomers for each of the emulsions P-2 to P-7. Table 2 also shows the glass transition point of the copolymer contained in each of the emulsions P-2 to P-7 calculated for the constituents other than the organopolysiloxane.

Seven fabric treatment baths were prepared each by diluting a 5 g portion of one of the copolymer emulsions P-1 to P-7 with water in an amount shown in Table 2 below together with or without addition of 1.0 g of a crosslinking agent and 0.5 g of a catalyst mentioned below. Namely, the crosslinking agent was an aqueous emulsion prepared by dispersing and emulsifying 30 parts of a methyl hydrogen polysiloxane of the formula Me$_3$Si—O—(SiHMe—O—)$_{50}$—(—SiMe$_2$—O—)$_{50}$—SiMe$_3$ having a viscosity of 150 centistokes at 25° C. in an aqueous medium which was an aqueous solution of 5 parts of a polyoxyethylene alkylphenyl ether in 65 parts of water. The catalyst for crosslinking reaction was an aqueous emulsion prepared by dispersing and emulsifying 30 parts of dibutyltin dilaurate in an aqueous medium which was an aqueous solution of 3 parts of the same polyoxyethylene alkylphenyl ether in 67 parts of water.

ple 1. A pure-cotton broadcloth of 210 counts/inch was treated with these treatment baths in the same manner as in Example 1 and evaluated for the elastic resilience by hand touch test along with measurement of the air permeability either as treated or after three times of laundering according to the laundering procedure specified in JIS L 0217, method 103, to give the results shown in Table 3 below. As a control, the same broadcloth was subjected to the same treatment as above excepting the use of pure water as the treatment bath and subjected to the same evaluation test to give the results also shown in Table 3.

TABLE 1

| Copolymer emulsion | | P-2 | P-3 | P-4 | P-5 | P-6 | P-7 |
|---|---|---|---|---|---|---|---|
| Polysiloxane emulsion | No. | E-2 | E-3 | E-4 | E-5 | E-6 | E-1 |
| | Amount taken, g | 556 | 333 | 333 | 333 | 333 | 556 |
| | Polysiloxane contained, g | 250 | 150 | 150 | 150 | 150 | 250 |
| Monomers copolymerized, g | Ethyl acrylate | | 328.6 | | | | 250 |
| | Butyl acrylate | 234.7 | | 164.3 | 312.2 | 213.6 | |
| | 2-Ethylhexyl acrylate | | | 164.3 | | | |
| | 2-Methoxyethyl aceylate | | | | | 98.6 | |
| | Acrylic acid | 7.5 | 10.5 | 10.5 | 15.8 | 15.8 | |
| | Methacrylic acid | 3.8 | 5.3 | 5.3 | | | |
| | N-Methylol acrylamide | 4.0 | 2.1 | | | 5.6 | |
| | N-Butoxymethyl acrylamide | | | 5.6 | | | |
| | Glycidyl methacrylate | | | | 5.6 | | |
| | 2-Hydroxyethyl methacrylate | | 3.5 | | | | |
| | Styrene | | | | 16.4 | | |
| | Acrylonitrile | | | | | 16.4 | |
| | Total | 250 | 350 | 350 | 350 | 350 | 250 |
| Glass transition point of copolymer, °C. (see text) | | −46 | −16 | −55 | −42 | −41 | −22 |

The above prepared treatment baths were used for the treatment of a knit cloth of pure cotton. Thus, the cloth was dipped in the treatment bath and, after removing the extraneous liquid by passing between squeezer rollers and preliminarily drying at 100° C. for 3 minutes, subjected to curing by heating at 150° C. for 2 minutes. The feeling of these finished cotton cloths was evaluated by hand touch for the softness and elastic resilience. The result were recorded in four ratings of A, B, C and D for excellent, good, fair and poor feelings, respectively, as shown in Table 2. As a control, the feeling of the cotton cloth subjected to the same treatment as above excepting the use of pure water as the treatment bath was evaluated to obtain the rating of D for each of the softness and elastic resilience.

TABLE 2

| Copolymer emulsion | P-1 | P-2 | P-3 | P-4 | P-5 | P-6 | P-7 |
|---|---|---|---|---|---|---|---|
| Water added, parts | 93.5 | 95 | 95 | 93.5 | 95 | 93.5 | 93.5 |
| Crosslinking agent & catalyst added | Yes | No | No | Yes | No | Yes | Yes |
| Softness | A | A | B | A | B | B | B |
| Elastic resilience | A | B | B | A | A | A | A |

EXAMPLE 2

Four fabric treatment baths were prepared each by diluting 20 parts of either one of the copolymer emulsions P-1 and P-4 prepared in Example 1 with water in an amount shown in Table 3 below together with or without addition of 5 parts of the same crosslinking agent and 1 parts of the same catalyst as used in Exam-

TABLE 3

| Copolymer emulsion | | P-1 | P-4 | P-1 | P-4 | Control |
|---|---|---|---|---|---|---|
| Water added, parts | | 80 | 80 | 74 | 74 | |
| Crosslinking agent & catalyst added | | No | No | Yes | Yes | |
| Elastic resilience | As treated | B | B | A | A | D |
| | After laundering | B | B | A | A | D |
| Air-permeability, ml/cm$^2$·sec | As treated | 2.5 | 2.6 | 2.2 | 2.1 | 12 |
| | After laundering | 9.0 | 8.8 | 7.5 | 7.0 | 11 |

EXAMPLE 3

The fabric treatment bath prepared in Example 1 using the copolymer emulsion P-4 was used for the finishing treatment of cloths of synthetic and natural fibers including nylon, polyester, mixture of polyester and cotton, acrylic, polypropylene, linen, silk and wool in the same manner as in Example 1. Each of these treated cloths exhibited a soft but dry feeling with little tackiness.

As in understood from the above described Examples, the fabric materials treated with the inventive fabric finishing agent was imparted with both of excellent softness and elastic resilience to give a good feeling. In addition, the inventive fabric finishing agent had a mesh-filling effect to decrease the air-permeability of the treated cloth with stability against laundering so that the treated cloths were found to be quite satisfactory as a material of wind-shielding wears.

What is claimed is:

1. A silicone-based fabric finishing agent which is an aqueous emulsion of a copolymer obtained by the emulsion polymerization of:
   (A) from 5 to 95 parts by weight of an organopolysiloxane represented by the general formula $$XO\text{---}(\text{---}SiR_2\text{---}O\text{---})_m\text{---}(SiRY\text{---}O\text{---})_n\text{---}X,$$

in which R is a monovalent hydrocarbon group or a halogen-substituted monovalent hydrocarbon group having 1 to 20 carbon atoms, Y is a radical-polymerizable monavalent organic group or a mercapto group-containing monavelent organic group, X is a hydrogen atom, a lower alkyl group or an organosilyl groups of the general formula $\text{---}SiR_2R^1$, R having the same meaning as defined above and $R^1$ being R or Y, m is a positive integer not exceeding 10,000 and n is a positive integer, in the form of an oil-in-water emulsion; and 95 to 5 parts by weight of either
   (B) an acrylic or methacrylic monomer represented by the general formula $$CH_2=CR^1\text{---}CO\text{---}OR^2$$

in which $R^1$ is a hydrogen atom or a methyl group and $R^2$ is an alkyl group or an alkoxy-substituted alkyl group having 1 to 18 carbon atoms or a combination of component (B) and one or both of
   (C) up to 10% by weight of component (B) of a polyfunctional monomer selected from the group consisting of ethylenically unsaturated amides, alkylol- or alkoxyalkyl-substituted ethylenically unsaturated amides, oxirane group-containing ethylenically unsaturated monomers, hydroxyl group-containing ethylenically unsaturated monomers, carboxyl group-containing ethylenically unsaturated monomers, esters of a polyhydric alcohol and acrylic or methacrylic acid, diallyl esters of dibasic carboxylic acids, allyl acrylate, allyl methacrylate and divinyl benzene, and
   (D) up to 20% by weight of component (B) of one or more ethylenically unsaturated monomers other than components (B) and (C);
   in the presence of a radical polymerization initiator.

2. The silicone-based fabric finishing agent as claimed in claim 1 wherein the monovalent hydrocarbon group denoted by R is an alkyl group or an aryl group.

3. The silicone-based fabric finishing agent as claimed in claim 1 wherein the lower alkyl group denoted by X is an alkyl group having 1 to 5 carbon atoms.

4. The silicone-based fabric finishing agent as claimed in claim 1 wherein the radical-polymerizable monovalent organic group denoted by Y is selected from the class consisting of vinyl group, allyl group, 3-acryloxypropyl group and 3-methacryloxypropyl group.

5. The silicone-based fabric finishing agent as claimed in claim 1 wherein the mercapto-containing monovalent organic group is 3-mercaptopropyl group.

6. The silicone-based fabric finishing agent as claimed in claim 1 wherein m has a value in the range from 500 to 8000.

7. The silicone-based fabric finishing agent as claimed in claim 1 wherein n has a value not exceeding 500.

8. The silicone-based fabric finishing agent as claimed in claim 1 wherein the alkyl group denoted by $R^2$ is selected from the class consisting of methyl group, ethyl group, propyl group, butyl group, isobutyl group, pentyl group, hexyl group, octyl group, 2-ethylhexyl group, decyl group, lauryl group, myristyl group, palmityl group and stearyl group.

9. The silicone-based fabric finishing agent as claimed in claim 1 wherein the alkoxy-substituted alkyl group denoted by $R^2$ is selected from the class consisting of methoxymethyl group, methyoxyethyl group, ethoxyethyl group an butoxyethyl group.

10. The silicone-based fabric finishing agent as claimed in claim 1 which further comprises a crosslinking agent and a catalyst for the crosslinking reaction.

11. The silicone-based fabric finishing agent as claimed in claim 10 wherein the crosslinking agent is an organohydrogen polysiloxane.

12. The silicone-based fabric finishing agent as claimed in claim 10 wherein the catalyst for the crosslinking reaction is selected from the class consisting of dibutyl tin acetate, dioctyl tin octoate, dioctyl tin laurate, zinc octoate, zinc laurate and titanate esters.

13. A silicone-based fabric finishing agent which is an aqueous emulsion of a copolymer obtained by the emulsion polymerization of:
   (A) from 5 to 95 parts by weight of an organopolysiloxane represented by the general formula $$XO\text{---}(\text{---}SiR_2\text{---}O\text{---})_m\text{---}(SiRY\text{---}O\text{---})_n\text{---}X,$$

in which R is a monovalent hydrocarbon group of a halogen-substituted monovalent hydrocarbon group having 1 to 20 carbon atoms, Y is a radical-polymerizable monovalent organic group or a mercapto group-containing monovalent organic group, X is a hydrogen atom, a lower alkyl group or an organosilyl group of the general formula $\text{---}SiR_2R^1$, R having the same meaning as defined above and $R^1$ being R or Y, m is a positive integer not exceeding 10,000 and n is a positive integer, in the form of an oil--in-water emulsion; and from 95 to 5 parts by weight of a combination of (B) an acrylic or methacrylic monomer represented by the general formula $$CH_2=CR^1\text{---}CO\text{---}OR^2.$$

in which $R^1$ is a hydrogen atom or a methyl group and $R^2$ is an alkyl group or an alkoxy-substituted alkyl group having 1 to 18 carbon aotms and (C) up to 10% by weight of component (B) of a polyfunctional monomer selected from the group consisting of ethylenically unsaturated amides, alkylolor alkoxyalkyl-substituted ethylenically unsaturated amides, oxirane group-containing ethylenically unsaturated monomers, hydroxyl group-containing ethylenically unsaturated monomers, carboxyl group-containing ethylenically unsaturated monomers, esters of a polyhydric alcohol and acrylic or methacrylic acid, diallyl esters of dibasic carboxylic acids, allyl acrylate, allyl methacrylate and divinyl benzene.

14. The silicone-based fabric finishing agent as claimed in claim 1 wherein a combination of (B) and up to 20% by weight thereof of a third monomer selected from the class consisting of styrene, vinyl acetate, vinyl propionate and vinyl ester of a branched alkyl-containing carboxylic acid is employed.

15. The silicone-based fabric finishing agent as claimed in claim 1 wherein a polymer of (B) or a in combination thereof with one or both of (C) and (D), in the absence of (A), has a calculated glass transition point not higher than 0° C.

16. The silicone-based finishing agent as claimed in claim 33 wherein component (C) comprises from 2% to 7% by weight of the acrylic or methacrylic monomer.

* * * * *

UNITED STATES PATENT AND TRADEMARK OFFICE
CERTIFICATE OF CORRECTION

PATENT NO. : 4,987,180
DATED : January 22, 1991
INVENTOR(S) : Hiroyuki Ohata et al.

It is certified that error appears in the above-identified patent and that said Letters Patent is hereby corrected as shown below:

Col. 1, lines 67 and 68, col. 11, lines 17 and 18 (claim) 1, and col. 12, lines 31 and 32 (claim) 13 Reads " $R^1$ " -- should read -- " R' "

Col. 12, line 66 (claim 16)

reads " claim 33" -- Should read -- 13

Col. 9, lines 3-4 The equation should read --

$Me_3Si-O(SiHMe-O-)_{50}-(-SiMe_2-O-)_{50}-SiMe_3$

Signed and Sealed this

Ninth Day of February, 1993

*Attest:*

STEPHEN G. KUNIN

*Attesting Officer*   Acting Commissioner of Patents and Trademarks